United States Patent [19]
Mayer et al.

[11] Patent Number: 5,225,785
[45] Date of Patent: Jul. 6, 1993

[54] APPARATUS FOR SENSING THE THICKNESS OF A MOVING SHEET OF FILM

[75] Inventors: Daniel W. Mayer, St. Paul, Minn.; Roger C. Oestreich, River Falls, Wis.

[73] Assignee: Modern Controls, Inc., Minneapolis, Minn.

[21] Appl. No.: 974,918

[22] Filed: Nov. 12, 1992

Related U.S. Application Data

[62] Division of Ser. No. 764,774, Sep. 24, 1991.

[51] Int. Cl.⁵ .................... G01B 21/08; G01R 27/26
[52] U.S. Cl. .................................. 324/671; 324/687; 324/690; 324/699; 324/701; 73/159; 73/160; 340/675
[58] Field of Search .................. 26/70; 73/159, 160; 340/675, 676, 677; 324/515, 701, 687, 690, 671, 699, 622

[56] References Cited

U.S. PATENT DOCUMENTS

| 2,870,403 | 1/1959 | Lippke | 324/671 |
| 3,657,645 | 4/1972 | Van Neuten | 324/695 |
| 3,867,691 | 2/1975 | Plessis | 324/662 |
| 4,682,105 | 7/1987 | Thorn | 73/159 |
| 4,968,947 | 11/1990 | Thorn | 324/701 |

FOREIGN PATENT DOCUMENTS

| 1109618 | 8/1984 | U.S.S.R. | 324/701 |
| 1538048 | 1/1990 | U.S.S.R. | 324/662 |

*Primary Examiner*—Kenneth A. Wieder
*Assistant Examiner*—Jose M. Solis
*Attorney, Agent, or Firm*—Palmatier, Sjoquist & Helget

[57] ABSTRACT

A rotatable capacitance sensor preferably constructed of a generally cylindrical body mounted on bearings to a carriage assembly. The body has a number of parallel, spaced apart conductive plates having edges extending through the exterior body surface, and alternate ones of the plates are connected via a bearing to a conductor in one part of the carriage assembly, and the remaining ones of the plates are connected via a bearing to a second conductor in another part of the carriage assembly.

6 Claims, 4 Drawing Sheets

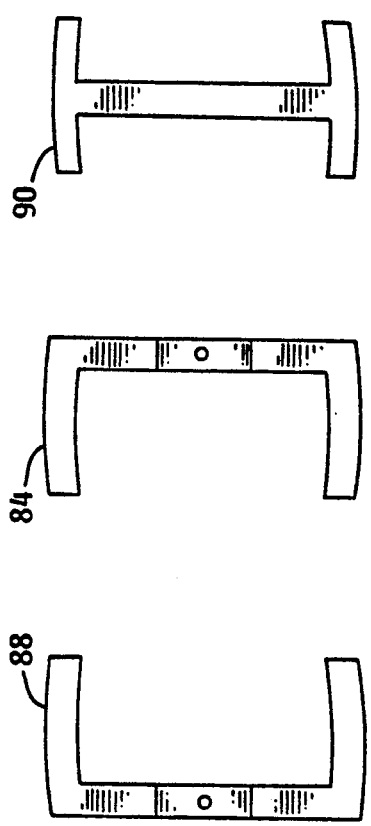
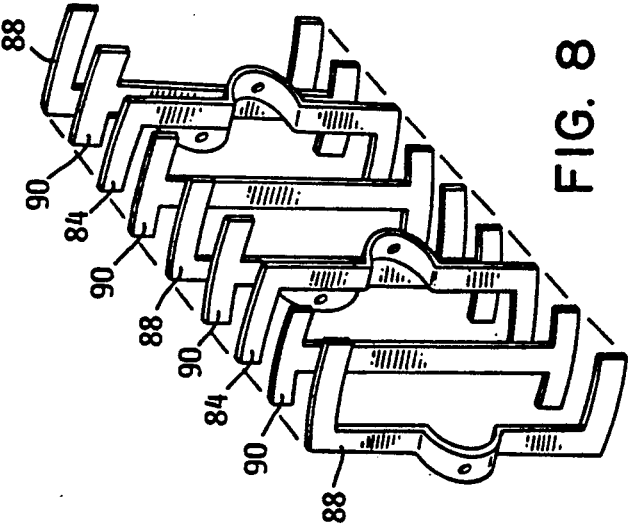
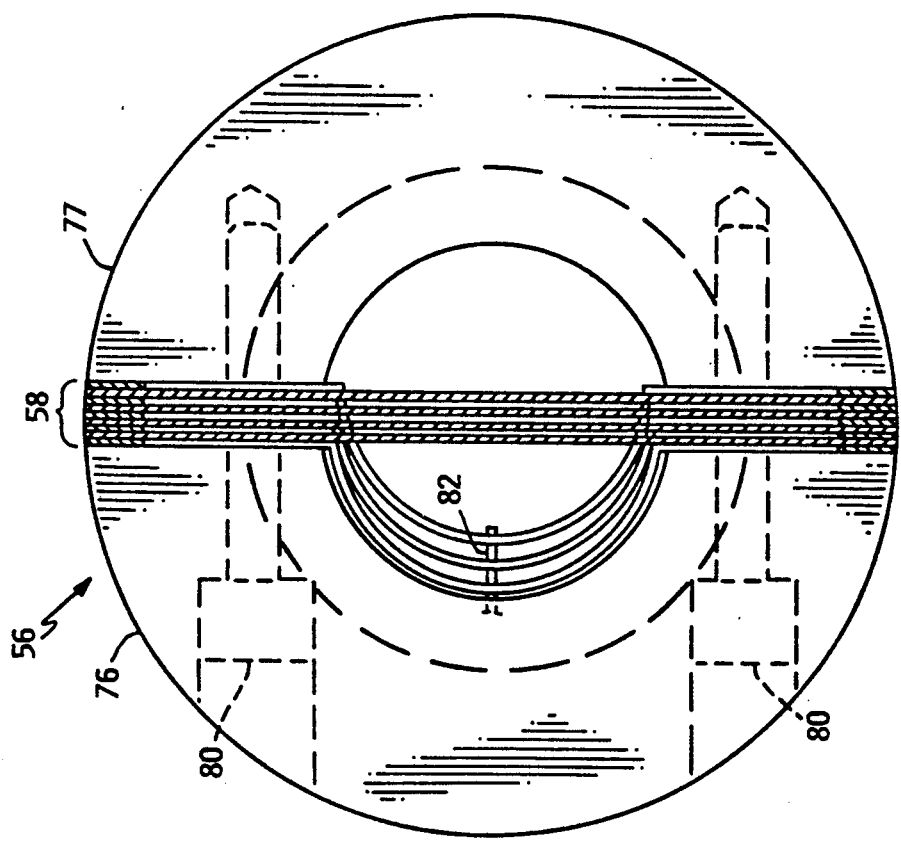

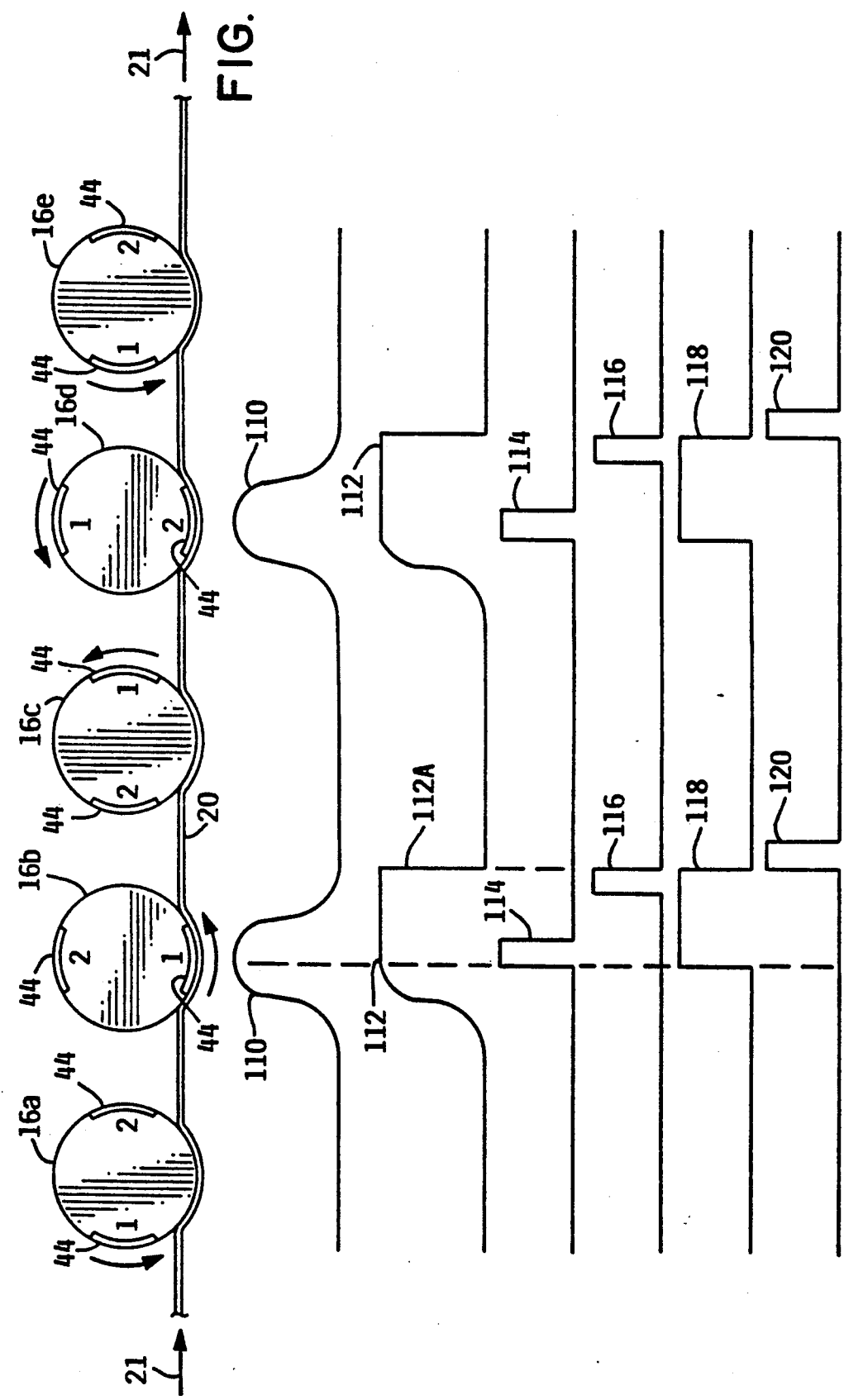

APPARATUS FOR SENSING THE THICKNESS OF A MOVING SHEET OF FILM

This is a division of U.S. application Ser. No. 07/764,774 filed Sep. 24, 1991.

BACKGROUND OF THE INVENTION

The present invention relates to an apparatus for measuring the thickness of moving films; more particularly, the invention relates to a rotatable sensor which makes rotatable contact with a moving sheet of thin material. The most notable application of the invention is in connection with measuring thickness of thin plastic film in sheet form, of the type typically manufactured in blown film machines.

Most prior art thickness gauges used in connection with blown film machines utilize contact devices; i.e., a sensor is brought into contact with a moving sheet of plastic film and film thickness measurements are made as the film passes the sensor head. Some of these devices are transversely movable across or around a blown film bubble so as to traverse the entire circumferential surface area of the film bubble. In other cases, the sensor head is mounted in a fixed position and the bubble itself rotates transversely at a slow turning rate at the same time as the film moves longitudinally past the head.

Some prior art film thickness measuring devices do not actually contact the film, but these devices generally suffer from the disadvantage of poor accuracy, and such devices are generally unable to make accurate measurements of thickness, particularly of very thin films.

Examples of prior art film thickness measuring devices are found in prior patents. U.S. Pat. No. 3,764,899, issued Oct. 9, 1973, discloses an electrode assembly which is mounted in a fixed position, and a thin plastic film strip is movably passed across a sensing head to obtain measurements of film thickness in conjunction with an electronic circuit for processing the capacitance signals produced thereby. U.S. Pat. No. 4,947,131, issued Aug. 7, 1990, discloses a capacitance bar sensor designed to be placed in contacting relationship with a moving film surface, to provide extremely accurate film thickness measurements independent of temperature variations. U.S. Pat. No. 3,300,716, issued Jan. 4, 1967, discloses a capacitance sensing apparatus for measuring transversely across a sheet of moving film, particularly disclosing electronic circuits for enhancing the signal processing. Various circuits for processing signals from a capacitance sensor of the type disclosed herein are well known from the foregoing and other prior art patents, and such circuits are not specifically dealt with in the present disclosure.

One of the problems with prior art contact sensors is that, because such sensors inherently must remain in contact with a moving film, they tend to mark or scratch the film surface. Such sensors may be designed to minimize this problem, but in particular film applications such as high-quality optical films, even fine hairline scratches on the film may be cause for concern. Because of the relative differences in velocity between the sensor and the film, the problem of film scratching is always present with sensors of this type.

SUMMARY OF THE INVENTION

The present invention relates to a rotatable sensor for capacitively measuring the thickness of a moving plastic film, wherein the axis of rotation of the sensor assembly is transverse to the direction of movement of the film. A sensor head is placed in contacting relation to the film and the head is rotatable by virtue of this contacting relationship, to produce a rate of travel of the head which is synchronized to the rate of travel of the film sheet. The capacitive sensing element of the sensor head is made from a plurality of conductive sheets which are interleaved with insulator strips, to produce rotatable capacitance plates embedded in the rotatable head assembly. The head assembly is mounted to a fixed or movable carriage by bearing assemblies which incorporate rotary contacts for conveying the capacitance electrical signals to an appropriate circuit or circuits for processing the signals. The carriage may be mounted to a transport mechanism for transporting the entire head assembly relative to the film surface.

It is a principal object and advantage of the present invention to provide a capacitance thickness measuring device for contacting a moving plastic film to obtain film thickness measurements.

It is another object of the present invention to provide a film thickness measuring device which contacts a film surface without scratching or otherwise damaging the film surface.

It is a further advantage and object of the present invention to provide a film thickness measuring device which provides highly accurate thickness measurements through rotatable contact with a moving film in speed synchronization with the film.

Other and further objects and advantages of the invention will become apparent from the following specification and, claims, and with reference to the appended drawings.

BRIEF DESCRIPTION OF THE DRAWINGS

FIG. 6 shows a view taken along the lines 6-6 of FIG. 5;

FIGS. 7A, 7B and 7C show the respective capacitance elements used to construct the apparatus of FIGS. 5 and 6;

FIG. 8 shows an exploded isometric view of the capacitance elements of FIGS. 7A, 7B, 7C;

FIG. 9A shows several rotational positions of the sensor of FIG. 5; and

FIG. 9B shows the electrical signal relationships which are produced from the sensor positions of FIG. 8A.

DESCRIPTION OF THE PREFERRED EMBODIMENT

Figure 1:
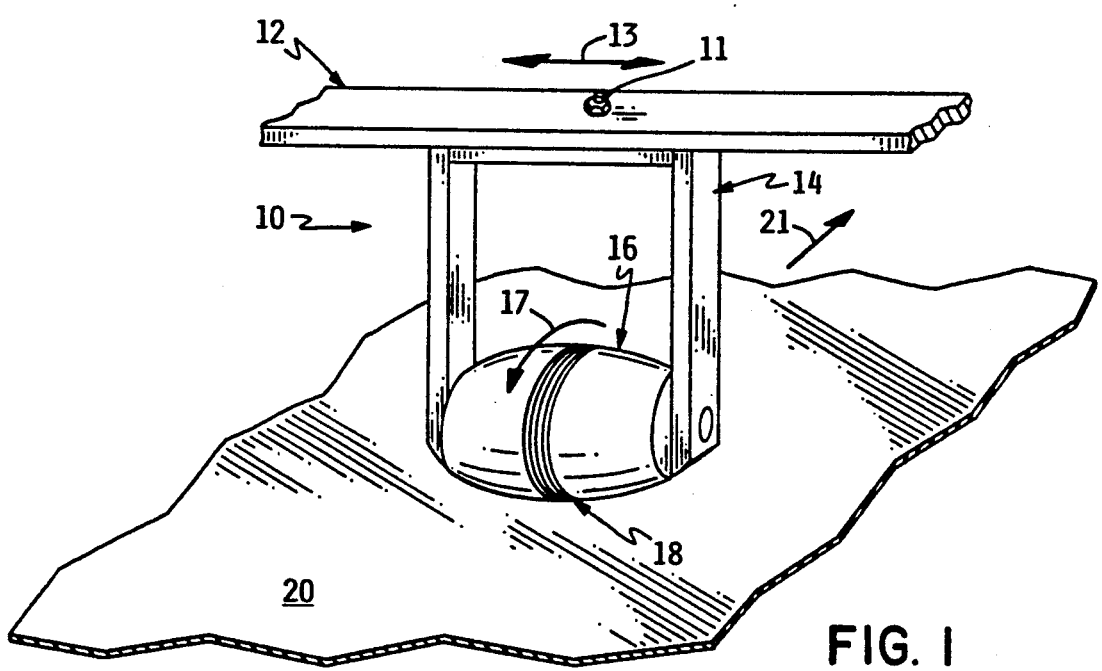
FIG. 1 shows an isometric view of one form of the invention.

FIG. 1 shows an isometric view of one form of the invention. A capacitance sensing assembly 10 is attached to a transport mechanism 12 by means of a pivotal connector 11. The transport mechanism 12 may allow for transverse movement of the sensing assembly 10 in the directions indicated by arrow 13. A carriage 14 may be affixed to transport mechanism 12, carriage 14 holding a rotatably-mounted sensor 16. The sensor 16 is positioned in contacting proximity to a movable plastic film sheet 20, the film sheet 20 being movable in the direction shown by arrow 21. The contacting relationship of sensor 16 with sheet 20 causes rotation of sensor 16 in the direction indicated by arrow 17. Sensor 16 incorporates a sensor head 18 which will be described in more detail hereinafter.

Figure 2:
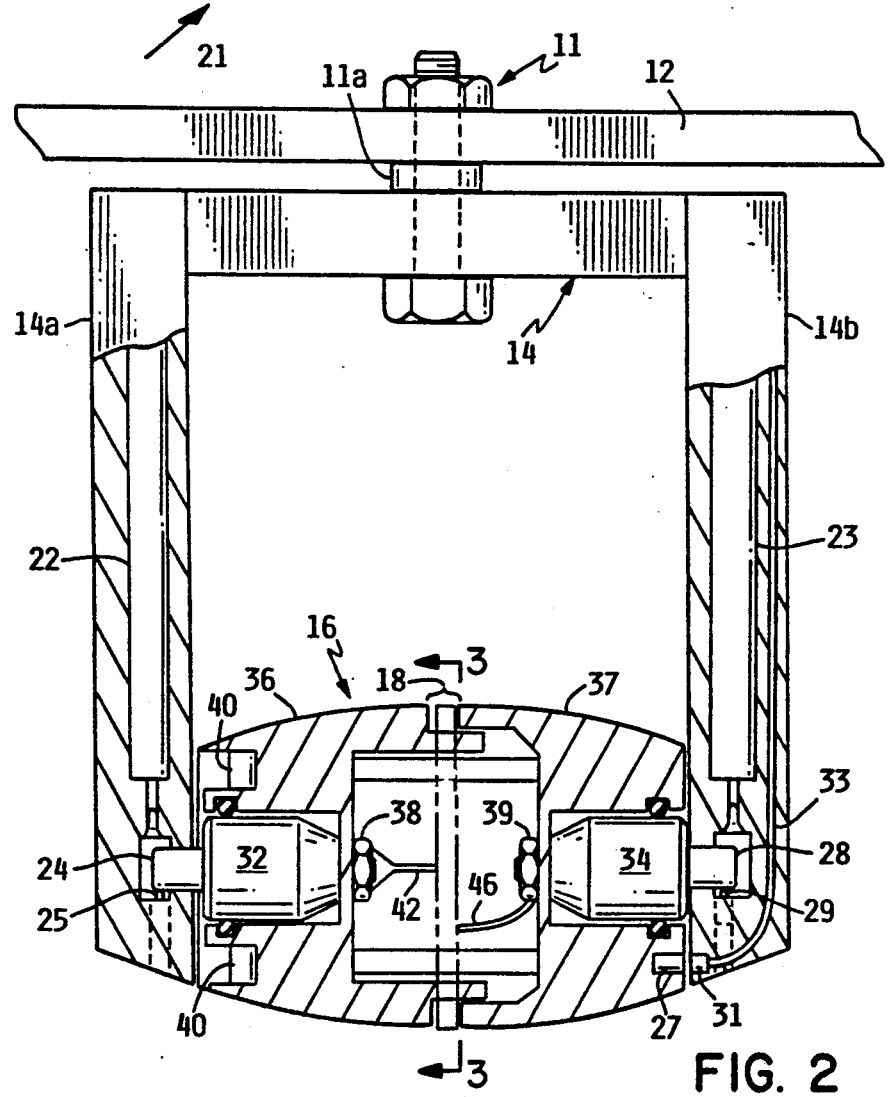
FIG. 2 shows the device of FIG. 1 in partial cross section.

FIG. 2 shows a partial cross-sectional view of the device of FIG. 1. Carriage 14 comprises a pair of downwardly-depending legs 14a and 14b which are preferably made from a nonconductive material such as a plastic material which is sold under the trademark "Delrin." Carriage 14 may be pivotally connected to transport mechanism 12 by means of a pivotal connector 11 in such case, a bearing 11a is preferably positioned to permit relative rotation of carriage 14 with respect to transport mechanism 12. Pivot connector 11 enables carriage 14 to automatically align itself with the longitudinal movement of film sheet 20. Legs 14a and 14b each have respective passages and cavities to pass conductors therethrough, and to affix the ends of shafts which are coupled to sensor 16. A first conductor 22 passes through a passage in leg 14a, conductor 22 being referred to herein as a "positive" conductor, which is electrically connected to a rotary contactor 32. Shaft end cap 24 is mechanically affixed to leg 14a by means of a set screw 25. Similarly, a "negative" conductor 23 passes through leg 14b and is electrically connected to a rotary contactor 34, and end cap 28 is mechanically affixed to leg 14b by a set screw 29. Shafts 24 and 28 respectively form a part of a rotary contactor 32 and 34. Rotary contactors 32 and 34 are commercially available devices which provide sealed mercury rotary contacts to a rotating mechanism, such as a device which is sold under the trade designation "Rotocon-M1," by Meridian Laboratory of Middleton, Wisconsin. The particular advantage of this device is that it enables a reliable electrical connection to be made between a rotating member and a filed member, through the use of sealed mercury rotary contacts. In the particular application described herein, shafts 24 and 28 are fixed members and rotary contactors 32 and 34 are rotatable members affixed inside of rotatable sensor 16. Shafts 24 and 28 form a part of the rotary contact device, enabling electrical connection between rotatable members and the respective conductors 22 and 23.

A magnet 27 may be embedded into one of the housings 36, 37 to rotate therewith. A magnetic pickup 31 is correspondingly positioned in the adjacent leg 14a, 14b, to detect the rotational movement of magnet 27. An electrical signal will be generated in magnetic pickup 31 which may be passed to a sensor external to the device via wire 33. This mechanism permits the rotational position of sensor 16 to be identified; more specifically, it enables the specific capacitive elements within sensor 16 to become uniquely identified. Magnet 27 and magnetic pickup 31 therefore provide an indexing of the rotational position of sensor 16. If a plurality of capacitive elements are designed into sensor 16, this indexing scheme enables each capacitive element to be uniquely identified. To the extent that different capacitive elements and sensor 16 produce different capacitive signals, the indexing scheme enables the different signals to be electronically averaged or balanced, or otherwise compensated for in external circuitry.

Figure 3:
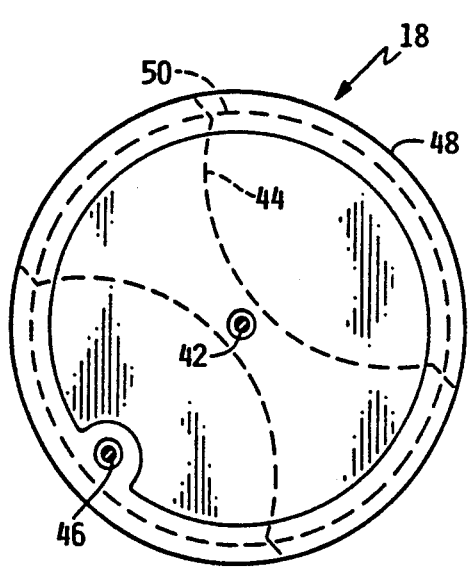
FIG. 3 shows a cross-sectional view taken along the lines 3—3 of FIG. 2.
Figure 4:
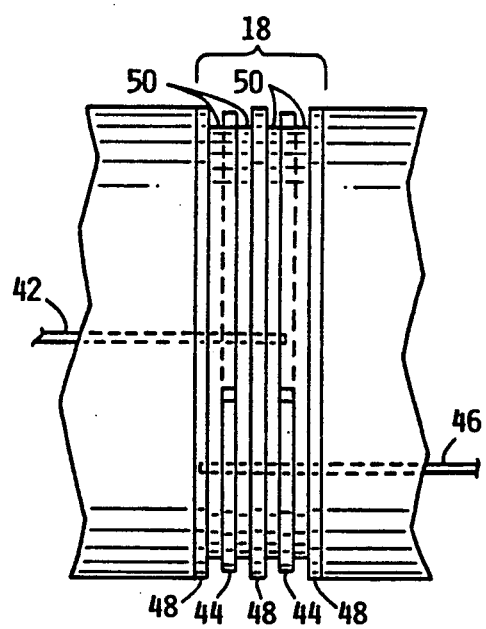
FIG. 4 shows an expanded view of a portion of FIG. 2.

Sensor 16 is formed from two split housings 36 and 37. Housing 36 is affixed to rotary contactor 32 by means of a threaded fastener 38. Split housing 37 is affixed to rotary contactor 34 by means of a threaded fastener 39. The two housing halves 36 and 37 are held together by means of threaded fasteners 40. The sensor head 18 is compressed between the two housing halves 36 and 37 by virtue of the threaded fasteners 40. A central wire 42 projects from the end of rotary contactor 32, and is affixed to the plurality of positive plates which make up sensor head 18 (see FIGS. 3 and 4). These positive plates are designated by the numeral 44, and are electrically connected to positive conductor 22 via wire 42 and rotary contactor 32. A wire 46 connects a plurality of negative plates 48 comprising sensor head 18 to rotary contactor 34. The negative plates 48 are electrically connected to negative conductor 23 via rotary contactor 34. A plurality of dielectric insulator rings 50 are interleaved between positive and negative plates, to electrically insulate respective adjacent plates, and to provide a known dielectric material between the plates. The outer diameter of insulator plates 50 is slightly smaller than the respective outer diameter of positive plates 44 and negative plates 48.

Figure 5:
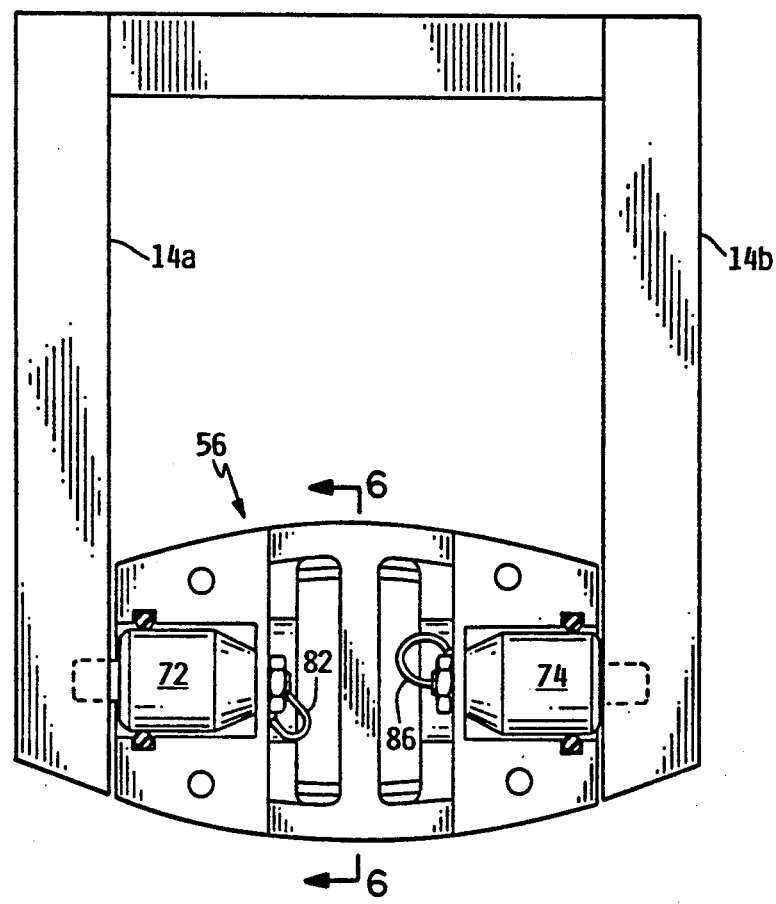
FIG. 5 shows a cross-section view of an alternative form of the invention.

FIG. 5 shows a cross-section view of an alternative embodiment of the sensor, designated sensor 56. Sensor 56 is rotatably mounted between legs 14a and 14b by rotary contactors 72 and 74, which are equivalent to the earlier-described rotary contactors 32 and 34. FIG. 6 shows a cross-section view taken along the lines 6—6 of FIG. 5, wherein sensor 56 is formed of two housing halves 76 and 77 which are affixed together along a diameter by fasteners 80. A sensor head 58 comprised of a plurality of plates is compressed between sensor housing halves 76 and 77.

The construction of sensor head 58 is illustrated in FIGS. 7A through 7C, and FIG. 8 wherein a plurality of negative electrode plates 88 and a plurality of positive electrode plates 84 are arranged in stacked formation, with a plurality of insulator plates 90 interleaved between adjacent positive and negative electrode plates. The respective positive and negative electrode plates each have an arcuate bend proximate the center point, and a hole for affixing a wire connection to the respective plates. A wire 82 connects the respective positive plates to the rotary contactor 72, and a wire 86 connects the respective negative plates to the rotary contactor 74. The thickness of the plates 84, 88 and 90 is considerably exaggerated in FIGS. 6 and 8 for illustration; in practice the plates would each be about 20 millimeters in thickness.

The respective alternative embodiments of the sensor each provide different advantages and capabilities. For example, the embodiment illustrated in FIGS. 1-4 has the capacitive electrodes aligned parallel to the direction of travel of the plastic film material. This provides the highest possible cross web resolution, so that the sensor may be transported transversely across the web to provide a member of discreet film thickness measurements. The sensor construction shown in FIGS. 5-8 has the capacitive electrodes aligned perpendicular to the direction of travel of the plastic film material, thereby providing the maximum down web resolution. A sensor constructed in this manner will provide thickness measurements at discreet down web positions of the moving plastic film material.

FIG. 9A shows five different rotary positions (16a-16e) for sensor 16, wherein in each position the positive plate 44 is rotated to a different angular position relative to a plastic sheet 20. The plastic sheet is presumed to be moving in the direction of arrow 21, and the respective representations of sensor 16 will therefore each rotate in the direction of arrow 17. For convenience, the end points of positive electrode 44 have been respectively identified with a "1" and a "2."

FIG. 9B shows a number of different electrical signals which are generated by the respective sensor positions represented in FIG. 9A, in conjunction with conventional electronic circuits which may be used to develop digital representations of sensor signals for further processing. Each signal event is illustrated in a time sequence which corresponds to the sensor 16 position shown immediately above the signal diagram of FIG. 9B. For example, the leftmost sensor 16 position shown in FIG. 9A (16a) shows that neither positive electrode plate is in contact with film 20. Therefore, no electrical signal will be generated by sensor 16a in the position shown. The sensor position shown by 16b places electrode "1" in direct contact with moving film 20, and results in the generation of voltage signal 110 as illustrated in FIG. 9B. Voltage signal 110 is an analog voltage signal, and the signal may be passed through an analog "peak and hold" circuit to produce the signal 112, which is a signal having a fixed and extended amplitude equal to the maximum amplitude of signal 110. The peak amplitude of signal 112 may be used to provide trigger signal 114, which may be used as the triggering event to initiate signal 118 to control an analog-to-digital converter circuit (A/D), which will enable the conversion of the peak value of signal 112 into a digital representation for subsequent processing in a digital computer. The time required for the A/D conversion process to occur is represented by signal 118, the trailing edge of which can be controlled by signal 116, to generate a reset signal 120 to initialize the circuitry for reception of the next subsequent signal.

The sensor position shown by 16c generates no signal, because the electrodes "1" and "2" are not in contact with film sheet 20. However, the sensor position 16d places electrode "2" in contact with film 20 and generates the sequence of signals shown in FIG. 9B, which are essentially identical to the sequence of signals illustrated with respect to 16b. The sensor position 16e also generates no further signals because the electrodes are not in contact with the film surface.

The foregoing signal representations may be utilized in driving conventional circuits which are well known in the art, to produce a digital representation of the magnitude of the signal sensed by sensor 16, which can be readily converted to a value representative of film thickness.

In operation the rotatable sensor 16 is placed in contacting relationship against a moving film surface, and the contact of the film against the sensor causes the sensor to rotate in coincidence with the film. The rate of film travel and the rotational speed of the sensor are identical, so the sensor cannot impart scratching against the film as a result of relative differences in rate of travel therebetween. In certain embodiments it may be desirable to impart a transverse motion to the overall sensor assembly, while permitting freely-rotatable motion of the sensor relative to the longitudinal travel of the film. In such embodiments the pivotal movement of the carriage permits transverse movement of the sensor at an angle relative to the film, and minimizes any tendency toward scratching of the film surface. The transverse rate of travel of the sensor head is considerably slower than the longitudinal rate of travel of the film, so that one pass of the sensor head across the transverse dimension of the film is accomplished during a fairly long longitudinal passage of film material.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed is:

1. An apparatus for measuring thickness of a moving sheet of film material, comprising:
   a) a frame mounted transverse to the direction of movement of said sheet of film material;
   b) a carriage mounted to said frame, said carriage having a pair of spaced apart legs directed toward said sheet of film material;
   c) a rotatable sensor head mounted between said spaced apart legs, said sensor head having a circular cross section contacting said film material, said circular cross section including a plurality of capacitor plates with interleaved dielectric insulators; and
   d) means for electrically coupling said capacitor plates to circuits for detecting changes in capacitance caused by changes in relative thickness of said moving sheet of film material.

2. The apparatus of claim 1, further comprising means for pivotally mounting said carriage to said frame.

3. The apparatus of claim 1, wherein said sensor head further comprises a generally cylindrical body having said plurality of capacitor plates aligned along the axis of said generally cylindrical body.

4. The apparatus of claim 1, wherein said sensor head further comprises a generally cylindrical body having said plurality of capacitor plates aligned parallel to the axis of said generally cylindrical body.

5. The apparatus of claim 1, further comprising a rotary contactor on respective ends of said sensor head, each of said rotary contactors being connected to one of said spaced apart legs.

6. The apparatus of claim 5, wherein said rotary contactors further comprise means for conveying electrical signals from said capacitor plates.

* * * * *